United States Patent [19]
Stolle

[11] Patent Number: 5,335,926
[45] Date of Patent: Aug. 9, 1994

[54] HYDRAULIC ACTUATING APPARATUS FOR OPENING AND CLOSING A VEHICLE COVER WITH AUXILIARY MANUAL HYDRAULIC PUMP

[75] Inventor: Klaus Stolle, Altenstadt, Fed. Rep. of Germany

[73] Assignee: Hoerbiger Ventilwerke Aktiengesellschaft, Vienna, Austria

[21] Appl. No.: 980,158

[22] Filed: Nov. 23, 1992

[30] Foreign Application Priority Data

Mar. 18, 1992 [AT] Austria ..................... 554/92

[51] Int. Cl.⁵ ..................... B60J 7/12; F16D 31/02
[52] U.S. Cl. ..................... 280/117; 60/405; 60/428
[58] Field of Search ............... 60/403, 405, 386, 420, 60/421, 428, 475, 476, 429; 91/508; 296/107, 117

[56] References Cited

U.S. PATENT DOCUMENTS

| | | | |
|---|---|---|---|
| 3,280,557 | 10/1966 | Sattavara | 60/405 |
| 3,492,816 | 2/1970 | Adams | 60/386 |
| 3,584,912 | 6/1971 | Leger | 296/117 |
| 4,013,138 | 3/1977 | McBurnett | 60/405 X |
| 4,077,211 | 3/1978 | Fricke | 60/428 |
| 4,116,577 | 9/1978 | Lauck | 60/405 X |
| 4,293,051 | 10/1981 | Nishikawa | 60/405 X |
| 4,317,499 | 3/1982 | Miller | 60/405 X |
| 4,410,057 | 10/1983 | Johnson | 60/405 X |
| 4,712,375 | 12/1987 | Kauss et al. | 60/405 |

FOREIGN PATENT DOCUMENTS

| | | |
|---|---|---|
| 155592 | 7/1987 | European Pat. Off. . |
| 2642653 | 3/1978 | Fed. Rep. of Germany . |
| 2818223 | 2/1979 | Fed. Rep. of Germany . |

*Primary Examiner*—Edward K. Look
*Assistant Examiner*—Hoang Nguyen
*Attorney, Agent, or Firm*—Watson, Cole, Grindle & Watson

[57] ABSTRACT

A hydraulic actuating apparatus for opening and closing a movable cover (convertible top) of a vehicle includes a piston/cylinder device, a reversible, motor driven pump for supplying hydraulic fluid to the piston/cylinder device to cause it to open or close the vehicle cover, and an auxiliary manual pump for supplying hydraulic fluid to the piston/cylinder device in the event of failure of the reversible pump.

3 Claims, 2 Drawing Sheets

HYDRAULIC ACTUATING APPARATUS FOR OPENING AND CLOSING A VEHICLE COVER WITH AUXILIARY MANUAL HYDRAULIC PUMP

FIELD OF THE INVENTION

The invention relates to an hydraulic actuating arrangement, in particular for a vehicle cover, having at least one cylinder/piston device whose operating spaces are connected reversibly to a motor-driven pump by way of hydraulic lines.

BACKGROUND OF THE INVENTION

Actuating arrangements of the type described are known and permit even substantial forces to be applied to relatively little space while using the known advantages of hydraulic operating cylinders, which is highly advantageous for example in the present application to a vehicle cover as a result of the conditions of space which are very restricted at least for actuating the cover. Despite all the advantages of hydraulic operating cylinders problems can arise with such actuating arrangements, particularly when for example the hydraulic pump or its motor breaks down or, as a result of an energy supply which is absent or insufficient, cannot provide the operating pressure or at least cannot provide it to an adequate extent. In this case it is generally only possible to continue the actuation manually, which is otherwise carried out hydraulically against the resistance of the hydraulic medium discharged for example by way of a pressure-relief valve or the like, which naturally requires a great deal of force.

SUMMARY OF THE INVENTION

The object of the present invention is to improve an hydraulic actuating arrangement of the type described above in such a way that the described disadvantages of the known arrangements are avoided, and in particular wherein it becomes possible in a simple manner for the normally hydraulic actuation to be continued without the application of particular manual force in the event of a breakdown of the motor-driven pump. In this way, it should be possible, for example when using the actuating arrangement for a vehicle cover, to close the latter simply and easily even in the event of a battery or current failure.

In the case of an hydraulic actuating arrangement of the type described above, this object is attained according to the invention in that an emergency pump is provided, and there is, parallel to the connection of the motor-driven pump to at least one of the operating spaces of the cylinder/piston arrangement, a further connection of the said operating space to the emergency pump, which can preferably be actuated manually. In this way, in the event of a breakdown of the motor-driven pump supplying the operating pressure during normal operation or a breakdown of the drive thereof, the actuation of for example a vehicle cover can be continued manually in a simple manner, for which no further operating or assembly steps are required on account of the structural conditions described. The actuation itself is left to the hydraulic cylinder/piston arrangement, so that no deviation from the normal operation of the element actuated is required. If necessary, various other hydraulic units can also of course be supplied if need be with operating pressure by way of the emergency pump connected in parallel, for example release cylinders of a locking arrangement for the operating cylinder or the like.

In a further development of the invention, non-return valves, which prevent a return flow to the collecting tank by way of the emergency pump, are fitted in the supply and discharge lines of the emergency pump. In this way, the emergency pump can remain switched on in the circuit in normal operation of the actuating arrangement without any shut-off valve, thus additionally simplifying the initiation of the emergency actuation in case of need and merely reducing it to the actuation of the emergency pump itself.

In the case of an actuating arrangement for a vehicle cover which closes when the piston rod of the cylinder/piston arrangement is extended, in a further embodiment of the invention it is provided that only one emergency pump is provided on the side of the piston space. In this way, although the emergency pump can be used merely for closing the vehicle cover, this ensures, with very little structural outlay, that the vehicle as a whole remains operative and usable even under adverse weather conditions. For various other cases of application, however, an emergency actuation of the operating cylinder in both directions of movement may be desired or necessary, it being immaterial in the context of the invention whether this emergency actuation on both sides then takes place by way of separate emergency pumps or by way of suitable reversing valves or the like on an emergency pump.

In accordance with a particularly preferred further development of the invention it is provided that, in order to brake the load dragging by the closing vehicle cover after a dead center has been exceeded, a lowering brake valve is provided, which is connected to the piston spaces by way of a control line, throttles the volume flow flowing off on the rod side when the pressure in the piston spaces is too low and allows this volume flow to pass through essentially unhindered when the piston pressure is sufficient. In this way, it is possible to prevent for example a vehicle cover from falling onto the top of the windscreen frame after overrunning the opening dead center with excessive speed. In accordance with the development described, this dragging load of the cover is braked in that when the pressure in the piston space controlling the lowering brake valve is excessive the volume flow flowing off on the rod side is throttled. When the pressure on the piston side is sufficiently high, the lowering brake valve is opened, as a result of which no throttling of the volume flow flowing off on the rod side takes place, and no additional pressure force is required for extending the cylinder either.

BRIEF DESCRIPTION OF THE DRAWINGS

The invention will be explained in greater detail below with reference to the embodiments illustrated diagrammatically in the drawings, in which.

DETAILED DESCRIPTION OF PREFERRED EMBODIMENTS

Figure 1:
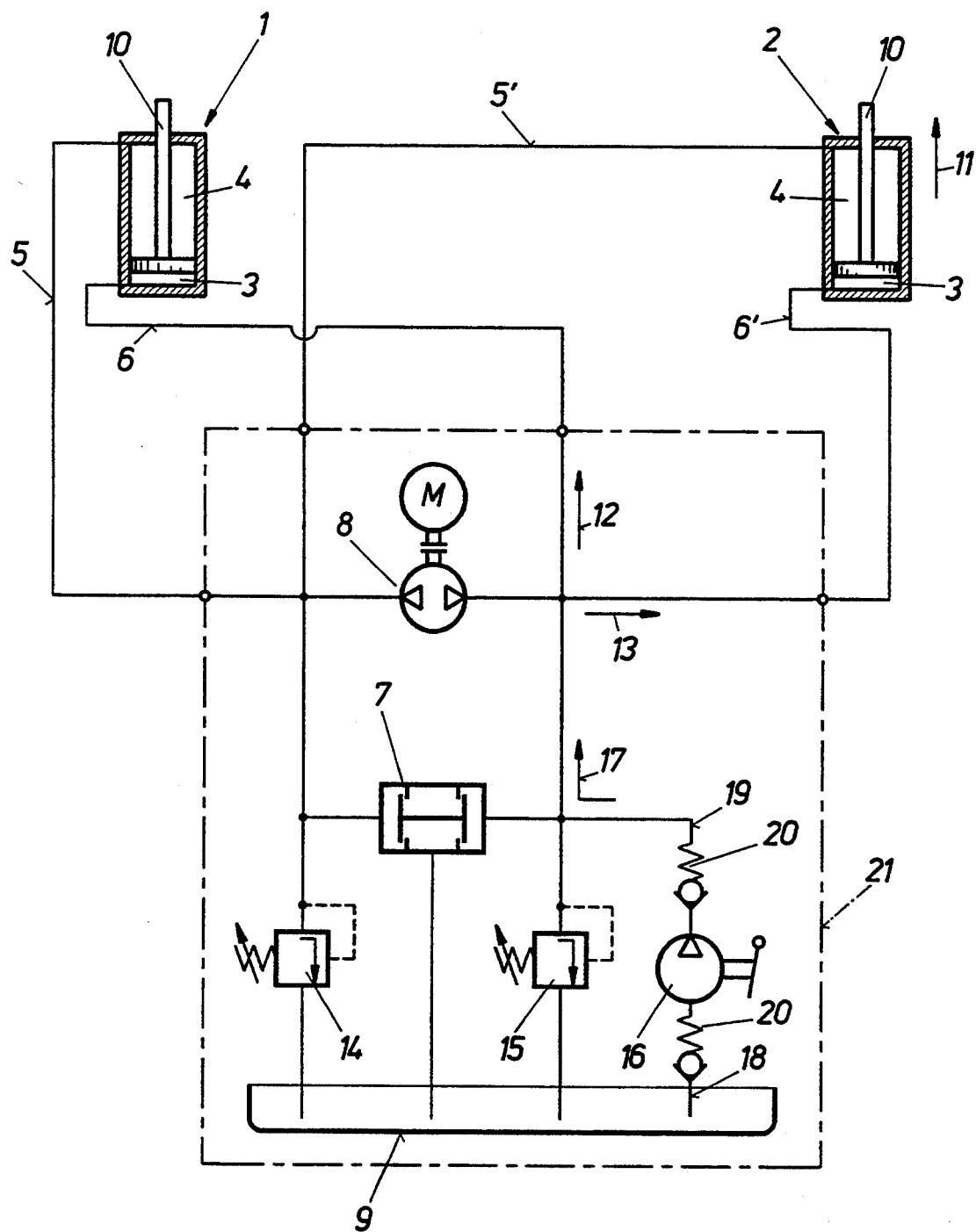
FIG. 1 is a circuit diagram of an hydraulic actuating arrangement according to the invention.

The hydraulic actuating device according to FIG. 1 comprises two cylinder/piston arrangements 1, 2, the operating spaces 3, 4, of which are reversibly connected by way of hydraulic lines 5, 5', 6, 6' and a reversing valve 7 to a motor-driven pump 8 on the one hand and to a collecting tank 9 on the other hand. The hydraulic pump 8, in this case driven electrically by way of the motor M for example, is reversible as indicated. If the piston rods 10 of the cylinder/piston arrangements 1, 2 used for example for actuating a vehicle cover (not shown further) are extended in the direction of the arrow 11, the pump 8 delivers hydraulic medium in the directions of the arrows 12, 13. The reversing valve 7 is present in the shifting position on the left in the illustration and seals off the pressure in the line. The hydraulic medium forced into the operating spaces 4 on the rod side is drawn directly from the motor-driven pump 8 by way of the lines 5, 5', but since the operating space 4 on the rod side is smaller than the rod-less operating space 3 on the piston side—which is to be filled—the pump 8 requires more hydraulic medium, which is drawn from the collecting tank 9 by way of the reversing valve 7 present in the left-hand position. The two pressure-relief valves 14, 15 are used here only for protecting the lines or hydraulic parts.

In order to be able to ensure a substantially unchanged hydraulic emergency actuation of the cylinder/piston arrangements 1, 2 even in the event of a pump 8 breaking down for example on account of a current failure at the motor M as the power supply, an emergency pump 16 is provided, there being, parallel to the connection of the motor-driven pump 8 to at least one of the operating spaces (in this case 3) of the cylinder/piston arrangements 1, 2, a further connection of the operating space 3 to the emergency pump 16 in each case, and the flow of hydraulic medium from the collecting tank 9 by way of the emergency pump 16 being indicated symbolically here by the arrow 17. Non-return valves 20, which prevent a return flow to the collecting tank 9 by way of the emergency pump 16, are fitted in the supply and discharge lines 18, 19 of the emergency pump 16, which is actuated manually in this case.

In the case of the described breakdown of the pump 8, only the manual actuation of the emergency pump 16 need therefore be carried out, after which hydraulic medium reaches the operating spaces 3 of the cylinder/piston arrangements 1, 2 on the piston side as shown by the arrows 17 or 12 and 13 respectively, and lets the piston rods 10 move out. Apart from the emergency actuation—provided on only one side in this case—for moving out the piston rods 10, an emergency operation also for moving in the piston rods could of course be made possible by a suitable arrangement of a further emergency pump or even a suitable reversing arrangement for an emergency pump, if this is desired or necessary for the application in question.

The pressure-relief valves 14, 15 are here together with the reversing valve 7, the motor-driven pump 8, the emergency pump 16 with the non-return valves 20 and all the connecting lines are arranged or constructed inside a pump carrier 21 indicated by dash-dot lines and on which only the motor M is flange-mounted and to which the separately removable collecting tank 9 is secured.

Figure 2:
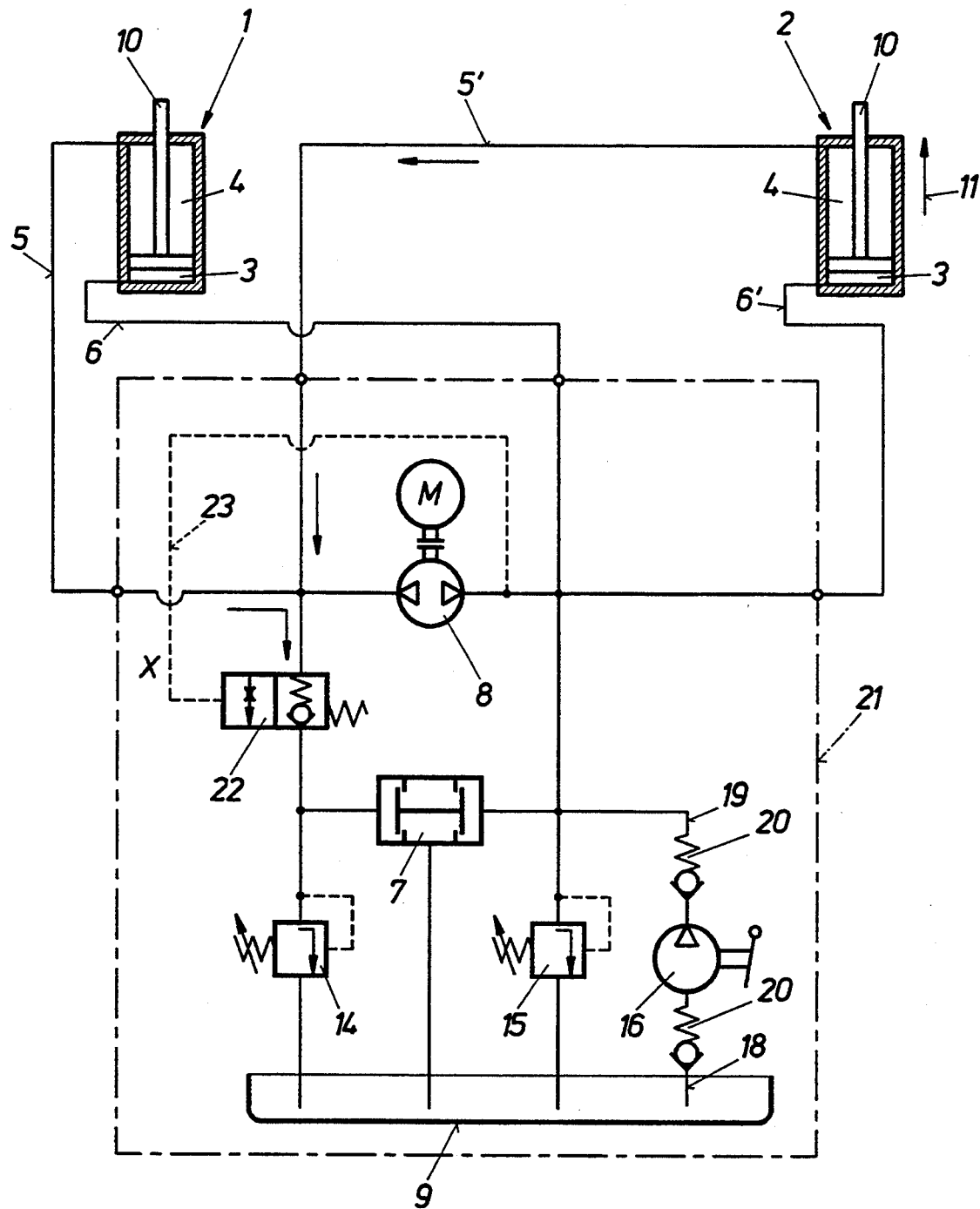
FIG. 2 is a circuit diagram corresponding to FIG. 1 of a further embodiment.

In the case of the embodiment shown in FIG. 2, the same components or components similar in their operation are in turn given the reference numerals already used in FIG. 1. Concerning the description and operation of these components, reference is made expressly to the above remarks on FIG. 1 in order to avoid repetition.

As shown in FIG. 2, the only essential change with respect to the embodiment according to FIG. 1 is a lowering brake valve 22 for braking the load dragging for example by a closing vehicle cover after a dead center has been exceeded; the lowering brake valve 22 is connected to the operating spaces 3 on the piston side by way of a control line 23 indicated by dashed lines, throttles the volume flow flowing off on the piston side by way of the hydraulic lines 5, 5' when the pressure in the piston spaces is too low and allows this volume flow to pass through essentially unhindered when the pressure in the piston spaces is sufficient, for which purpose it is adjustable by way of the control line 23 as indicated.

In this way, it is possible to prevent for example the cover of a vehicle from falling onto the top of the windscreen frame after overrunning a dead center when closing it with excessive speed. The dragging load is braked by the lowering brake valve 22 fitted on the rod side, since with insufficient pressure in the operating spaces 3 on the piston side the lowering brake valve 22 occupies that shifting position in which the volume flow flowing off is throttled. If the cover or the component to be actuated is not subjected to dragging before the dead center, however, the control line 23 causes the lowering brake valve 22 to be reversed into that control position in which essentially no throttling of the volume flow flowing off on the rod side occurs.

What is claimed is:

1. A vehicle which includes a cover and a hydraulic actuating apparatus for opening and closing the cover, said hydraulic actuating apparatus comprising:
   a piston/cylinder device which is mounted in said vehicle and includes a cylinder and a piston, said piston including a head which moves in said cylinder to define first and second variable volume operating spaces in said cylinder and a rod which is connected to open and close said cover,
   a versible, motor-driven pump,
   a first hydraulic line connecting the first operating space in said cylinder with said reversible pump and a second hydraulic line connecting said reversible pump with said second operating space, said reversible pump supplying hydraulic fluid through said first hydraulic line to said first operating space to cause said piston to move and open said cover or supplying hydraulic fluid through said second hydraulic line to said second operating space to cause said piston to move and close said cover, and
   a manual pump connected to said second hydraulic line for supplying hydraulic fluid to said second operating space and causing said piston to move and close said cover in the event of failure of said reversible pump.

2. A hydraulic actuating apparatus according to claim 1, including reservoir means containing hydraulic fluid and a third hydraulic line which extends between said reservoir and said second hydraulic line, said manual pump being connected in said third hydraulic line, a first non-return valve positioned in said third hydraulic line between said reservoir and said manual pump and a second non-return valve positioned in said third hydraulic line between said manual pump and said second hydraulic line.

3. A hydraulic actuating apparatus according to claim 2, including a lowering brake valve in communication with said first hydraulic line which when activated will throttle flow of hydraulic fluid out of said first operating space after said piston has moved said cover past a dead center point, thereby slowing closing of said cover, said lowering brake valve including a pressure line connected to said second hydraulic line for activating said lowering brake valve upon on a lowering of hydraulic pressure in said second hydraulic line.

* * * * *